(12) United States Patent
Aiden et al.

(10) Patent No.: US 9,709,718 B2
(45) Date of Patent: Jul. 18, 2017

(54) SYSTEMS AND METHODS FOR PRODUCING NARROWBAND IMAGES

(71) Applicant: Elwha LLC, Bellevue, WA (US)

(72) Inventors: Erez Lieberman Aiden, Cambridge, MA (US); Philip A. Eckhoff, Kirkland, WA (US); William Gates, Medina, WA (US); Peter L. Hagelstein, Carlisle, MA (US); Roderick A. Hyde, Redmond, WA (US); Jordin T. Kare, Seattle, WA (US); Robert Langer, Newton, MA (US); Eric C. Leuthardt, St. Louis, MO (US); Nathan P. Myhrvold, Bellevue, WA (US); Michael Schnall-Levin, Cambridge, MA (US); Clarence T. Tegreene, Mercer Island, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 404 days.

(21) Appl. No.: 14/083,198

(22) Filed: Nov. 18, 2013

(65) Prior Publication Data

US 2015/0138635 A1  May 21, 2015

(51) Int. Cl.
*G02B 27/22* (2006.01)
*G02B 5/28* (2006.01)
*H04N 13/04* (2006.01)

(52) U.S. Cl.
CPC ........... *G02B 5/28* (2013.01); *G02B 27/2207* (2013.01); *H04N 13/0431* (2013.01)

(58) Field of Classification Search
CPC .......... G02B 5/20; G02B 7/006; G02B 27/22; G02B 2027/0134; G02B 27/2207; G02B 26/02; G02B 5/28; G02F 1/133514; G02F 1/133526; H04N 13/0422; H04N 2213/008; H04N 13/0431
USPC ....... 359/462, 463, 464, 466, 477, 885, 891, 359/892
See application file for complete search history.

(56) References Cited

U.S. PATENT DOCUMENTS

| 5,963,371 A | 10/1999 | Needham et al. |
|---|---|---|
| 8,403,489 B2 | 3/2013 | Richards et al. |
| 2007/0188711 A1 | 8/2007 | Sharp et al. |
| 2007/0247709 A1 | 10/2007 | Karakawa |

(Continued)

*Primary Examiner* — Jade R Chwasz

(57) ABSTRACT

A system may produce images including narrow-bandwidth colors. One or more sets of the narrow-bandwidth colors may be selected to be interpreted as substantially a same color by a user. The system may include a light source configured to produce the narrow-bandwidth colors, and/or narrow-passband filters may create narrow-bandwidth colors from light emitted by broad-spectrum light sources or color sources. Spatial and/or time multiplexing may be used to create separate narrow-bandwidth colors interpreted as substantially a same color by the user. For example, the light source and/or the narrow-passband filter elements may be adjustable and may alternate between emission of two or more narrow-bandwidth colors. A viewing device may include filters allowing the user to selectively filter the narrow-bandwidth colors. The user may filter the narrow-bandwidth colors to separate a stereoscopic image pair, to view a user-specific image, to view desired content obfuscated by an obfuscating image, and/or the like.

26 Claims, 10 Drawing Sheets

(56) References Cited

U.S. PATENT DOCUMENTS

| | | |
|---|---|---|
| 2008/0158672 A1 | 7/2008 | McCosky |
| 2008/0278807 A1 | 11/2008 | Richards et al. |
| 2008/0284982 A1 | 11/2008 | Richards et al. |
| 2010/0060857 A1 | 3/2010 | Richards et al. |
| 2011/0187715 A1* | 8/2011 | Jacobs ............... H04N 13/0431 345/426 |
| 2012/0293747 A1 | 11/2012 | Sharp et al. |
| 2013/0002652 A1 | 1/2013 | Woo |
| 2013/0307831 A1 | 11/2013 | Robinson et al. |

* cited by examiner

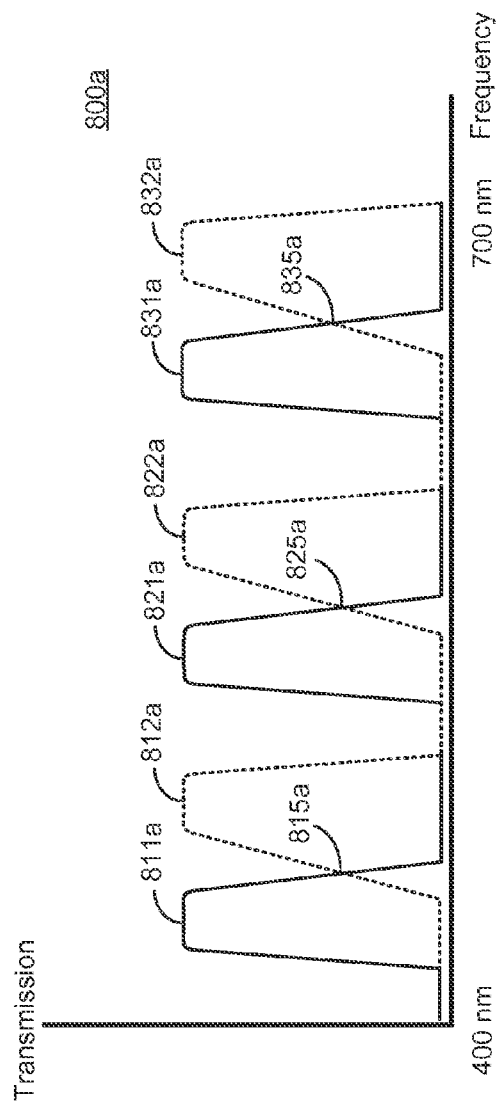
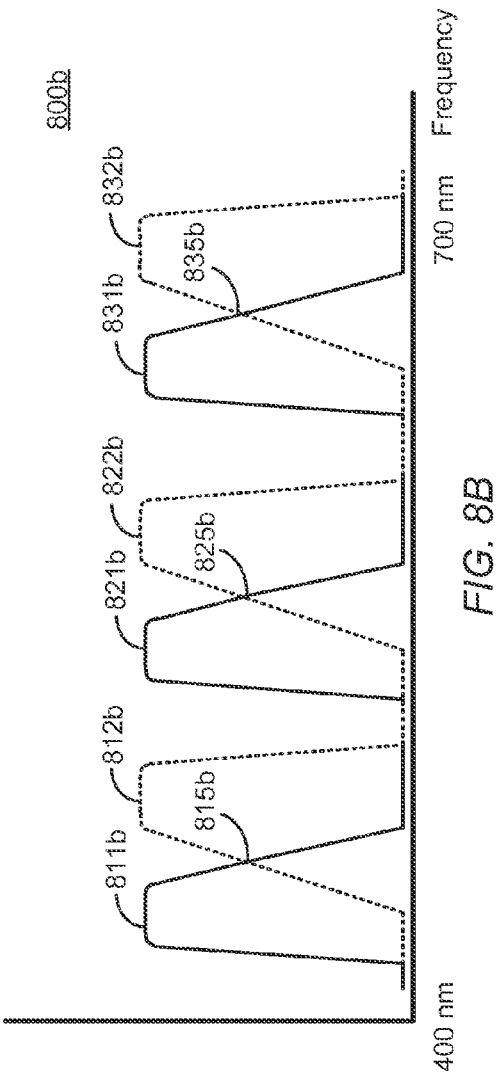
FIG. 8A
FIG. 8B

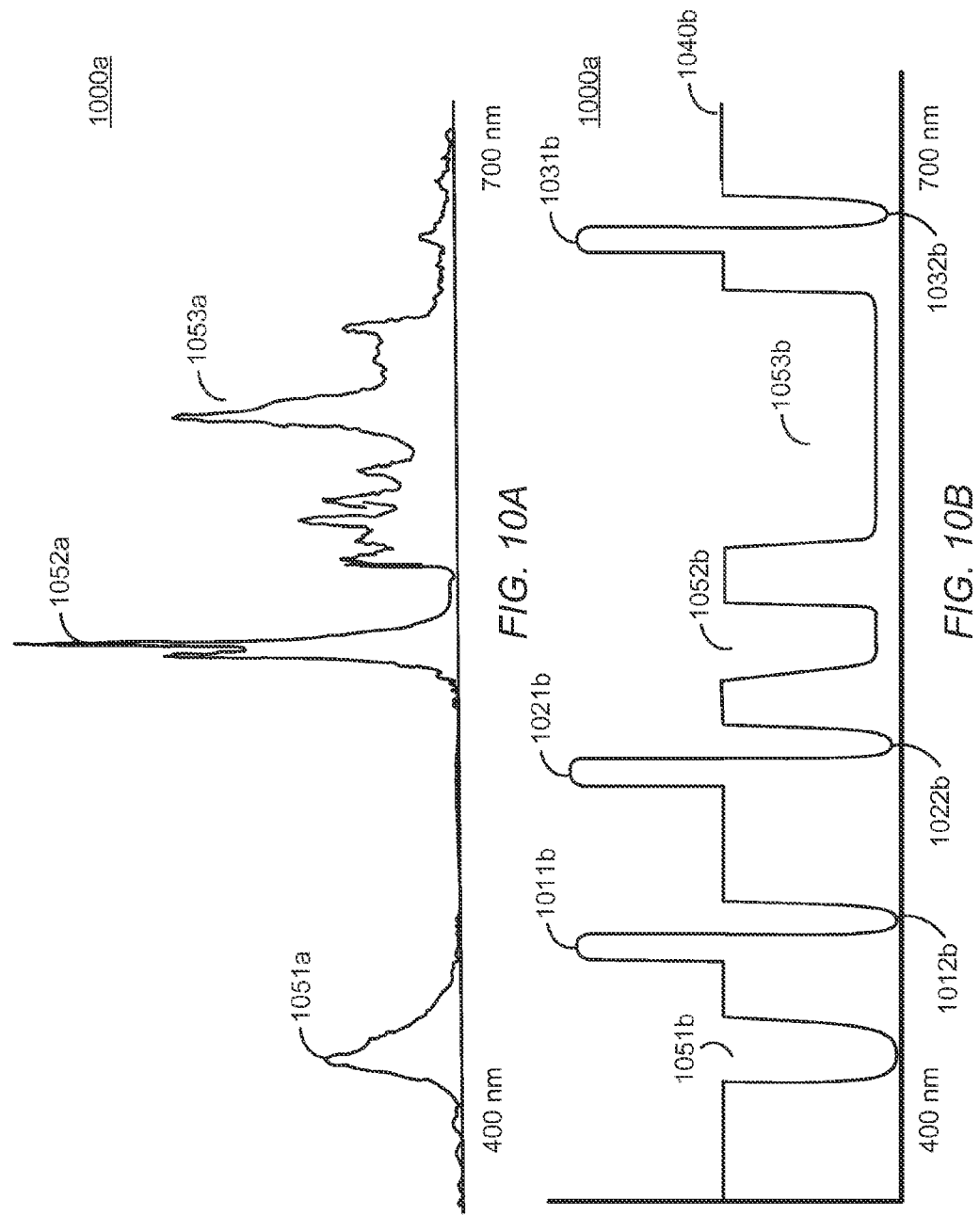

SYSTEMS AND METHODS FOR PRODUCING NARROWBAND IMAGES

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This application relates to systems and methods for producing narrowband images for viewing by a user.

SUMMARY

A system may produce images comprising narrow-bandwidth colors that can be selectively filtered by users to simulate a three dimensional image, to allow multiple users to watch different programs, to allow users to view obfuscated images, and/or the like. A plurality of images may be displayed sequentially in time to produce video. Various embodiments of the system are contemplated. In one embodiment, the system may include a light source that emits light to a plurality of pixels. Each pixel may include a plurality of narrow-passband filter elements and at least one intensity control element. A control mechanism may adjust the intensity of light in a first narrow passband and the intensity of light in a second narrow passband using the at least one intensity control element. The first narrow passband may be noncoincident with the second narrow passband but selected to be interpreted by a user as substantially a same color.

In other embodiments, one or more narrow-band light sources may emit light in a first narrow band and a second narrow band to a plurality of pixels. Each pixel may include an intensity control element, such as a liquid crystal element, configured to control transmission intensity of light received from the narrow-band light source. A control mechanism may selectively instruct the narrow-band light sources to emit light in the first and second narrow bands and selectively instruct the intensity control elements to pass an indicated intensity of light in each narrow band. There may be one narrow-band light source configured to switch between two or more narrrow bands when emitting light, and/or there may be one light source for each narrow band. Each pixel may also include one or more color filters and/or narrow-passband filters.

In still another embodiment, each pixel may include one or more light emitters and one or more filters. A control mechanism may be configured to selectively instruct each pixel to emit light in two or more narrow bands at indicated intensities. The light emitters may be broad-spectrum light sources, color sources, and/or narrow-spectrum light sources. The one or more filters may be a plurality of narrow-passband filters, a tunable filter configured to switch between passing the two or more narrow bands, and/or the like.

A user may view the images with a viewing device, such as an enhanced contrast viewing device. A transmission spectrum of a first lens of the enhanced contrast viewing device may include one or more narrow passbands to pass a desired image and a wide attenuation band to block background light. The wide attenuation band may be a partial-attenuation band, a stopband, and/or the like. The wide attenuation band may occupy a larger portion of a spectrum of each color than the one or more narrow passbands. The transmission spectrum may also include one or more narrow stopbands to block undesired images. The one or more narrow stopbands and the one or more narrow passbands may be selected to correspond to light emissions interpretable as substantially a same color by a user. The enhanced contrast viewing device may include a second lens with a transmission spectrum matching or complementary to the transmission spectrum of the first lens. The first and/or second lens may be interchangeable in some embodiments.

BRIEF DESCRIPTION OF THE DRAWINGS

FIGS. 8A-8B are graphs of transmission spectrums for a plurality of filters corresponding to the emission spectrum for the plurality of color sources.

FIGS. 10A-10B are a graph of an emission spectrum of a background light source and a graph of a corresponding transmission spectrum of one or more filters in a viewing device.

DETAILED DESCRIPTION OF PREFERRED EMBODIMENTS

Figure 1A:
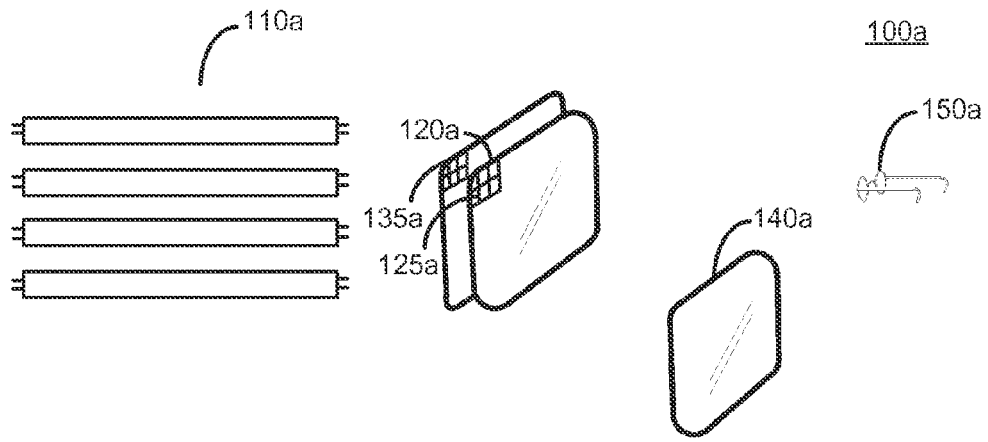
FIGS. 1A-1C are expanded views of systems for producing images including narrow-bandwidth colors using a plurality of narrow-passband filter elements.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A system may produce images that include narrow-bandwidth colors for viewing by a user. The user may selectively filter the images to produce desired content. In an embodiment, a first image may be produced using light including a first set of one or more narrow-bandwidth colors and a second image may be produced using light including a second set of one or more narrow-bandwidth colors. The first and second sets of narrow-bandwidth colors may be noncoincident and may be selected to be interpreted as substantially a same set of colors by a user. The first and second images may be, for example, a stereoscopic pair that produce an appearance of a three dimensional image, images specific to users (e.g., each user views a different image), a desired image and an obfuscating image configured to prevent unwanted persons from viewing the desired image, and/or the like. For example, the desired image may include text, and the obfuscating image may include an obfuscation, such as a camouflaging image, a solid shape, an area of uniform brightness, Gaussian noise, spatially-filtered noise with a same spatial frequency as the desired image, a random pattern, false text, a complementary image, a picture, and/or the like. The obfuscating image may comprise a higher contrast than the desired image, a larger average intensity than the desired image, and/or the like.

The user may view the first and second images through a viewing device that appropriately processes the first and second images. For example, the viewing device may include a plurality of filters. The filters may separate the stereoscopic pair, so each eye views only one image from the stereoscopic pair. To do so, a first filter may block the first set of narrow-bandwidth colors and a second filter may block the second set of narrow-bandwidth colors. The filters may pass only an image specific to the user and block images specific to other users. The filters may block the obfuscating image so only the desired image is visible by the user without obfuscation. The viewing device may include, for example, eyeglass lenses, contacts, a window with first and second lenses, and/or the like. The filters may include a filter assembly. The filter assembly may include one or more filter elements and/or may include one or more interchangeable filters. The interchangeable filters may be exchanged to switch between processing stereoscopic image pairs, images specific to users, image pairs with obfuscation, and/or the like.

The system may include a plurality of pixels. Each pixel may include a plurality of subpixels. Each subpixel may, for example, transmit light with a narrow bandwidth. The intensity of the light transmitted by each subpixel may be varied so the user perceives the pixel as emitting a large variety of different colors. In an embodiment, the subpixels may be configured to transmit light that is red, green, blue, yellow, and/or the like. Subpixels may also, or instead, have transmission spectrums slightly offset from those of other subpixels so the user can selectively filter the transmissions, but the transmissions are still interpreted as substantially the same color by the user.

The subpixels may transmit light by filtering and/or controlling the intensity of light received from one or more other sources, directly emitting light, and/or the like. For example, each pixel may include one or more narrow- and/or broad-passband filter elements and/or may include one or more intensity control elements, such as a transmissive liquid crystal element, a liquid crystal on silicon ("LCoS") element, a digital micromirror, and/or the like. The one or more intensity control elements may adjust the intensity of light emitted by the pixel to produce a color. In an embodiment, the system may include a broad-spectrum light source, a plurality of narrow-passband filter elements, and one or more intensity control elements. There may be one intensity control element for each filter element, one intensity control element for each color, and/or the like.

In another embodiment, the system may include one or more narrow-band light sources and/or one or more intensity control elements. The system may also include one or more color filters encompassing narrow-bandwidth colors of a same color and/or a plurality of narrow-passband filter elements. There may be one narrow-band light source for each narrow-bandwidth color to be transmitted, a single narrow-band light source may selectively switch between emission of each of a plurality of narrow-bandwidth colors, and/or the like. There may be one intensity control element for each filter element and/or more or fewer than one. In yet another embodiment, the system may include one or more color sources, a plurality of narrow-passband filter elements, and/or one or more intensity control elements. Intensity may be controlled by adjusting the one or more intensity control elements and/or by adjusting the intensity of the one or more narrow-band light sources or the one or more color sources. A control mechanism may selectively instruct the pixels and/or intensity control elements as to the transmission intensity for each narrow-bandwidth color to produce the first and second images.

In an embodiment, each pixel may include at least one light emitter, such as an OLED, and one or more filters. Each pixel may also include one or more intensity control elements. A control mechanism may instruct the pixel to emit a first set of one or more narrow-bandwidth colors with a first set of intensities and a second set of one or more narrow-bandwidth colors with a second set of intensities. The pixel may include one light emitter for each narrow-bandwidth color to be produced, and/or one light emitter may be used to produce multiple narrow-bandwidth colors. The filters may produce the narrow-bandwidth colors from the light emitted by the at least one light emitter by spatial and/or time multiplexing (e.g., there may be a narrow-passband filter for each narrow-bandwidth color to be produced and/or one or more tunable filters alternating between narrow passbands). There may be one or more than one filter and/or intensity control element per light emitter.

The system may use spatial and/or time multiplexing to produce the narrow-bandwidth colors. For example, each pixel may only be able to produce fewer than all narrow-bandwidth colors at one time. Accordingly, each pixel may produce a first set of one or more narrow-bandwidth colors during a first image frame and a second set of one or more narrow-bandwidth colors during a second image frame. The second set of narrow-bandwidth colors may be blocked during the first image frame, and the first set of narrow-bandwidth colors may be blocked during the second image frame. In some embodiments, each pixel may have a plurality of spatially disparate subpixels and may be able to produce every narrow-bandwidth color simultaneously. The spatially disparate subpixels may include spatially disparate light source, spatially disparate narrow-passband filters, and/or the like. Alternatively, or in addition, spatial multiplexing may include displaying a first set of narrow-bandwidth colors with a first set of pixels and a second set of narrow-bandwidth colors with a second set of pixels.

Although discussion so far been directed to two narrow-bandwidth colors and/or sets of narrow-bandwidth colors, embodiments may include any number of narrow-bandwidth colors and/or sets of narrow-bandwidth colors. For example, the system may be configured to produce images specific to each of more than two users, and/or one or more images specific to users may be a spectroscopic pair. Accordingly, the system may produce a third narrow-bandwidth color, a fourth narrow-bandwidth color, etc. that are selected to be interpreted as substantially the same color as a first and second narrow-bandwidth color. The control mechanism may instruct one or more intensity control elements to adjust the intensity of the third and fourth narrow-bandwidth colors.

The plurality of pixels may produce a different image with each narrow-bandwidth color. The plurality of pixels may produce a first stereoscopic pair using the first and second narrow-bandwidth colors and a second stereoscopic pair using the third and fourth narrow-bandwidth colors. To produce approximately the same color space, the emission spectrums of the third and/or the fourth narrow-bandwidth colors may be between the emission spectrums of the first and second narrow-bandwidth colors. In an embodiment, the emission spectrums of the first and second narrow-bandwidth colors may be equidistant from a center frequency, and the emission spectrums of the third and fourth narrow-bandwidth colors may be equidistant from the same center frequency. Alternatively, or in addition, a first image may be produced with two or more distinct narrow-bandwidth colors interpretable as a same color, and a second image may be produced with another narrow-bandwidth color distinct from the two or more narrow-bandwidth colors used to produce the first image. The narrow-bandwidth color used to produce the second image may be between the two or more narrow-bandwidth colors used to produce the first image.

The system may include various light sources. In an embodiment, the system may include a broad-spectrum light source. The broad-spectrum light source may produce white light; a broad, continuous spectrum; a plurality of colors; a plurality of narrow spectral lines/spikes; and/or the like that can be filtered to produce the narrow-bandwidth colors. Alternatively, or in addition, the system may include a narrow-spectrum light source, such as a laser, a phosphor, a light emitting diode ("LED"), an OLED, and/or the like. The narrow-spectrum light source may include one or more filters to produce the narrow-bandwidth colors. A narrow-spectrum light source may include a broad-spectrum light source and one or more narrow-passband filter elements configured to convert broad-spectrum light to narrow-bandwidth colors delivered to a plurality of pixels. A mechanical interchange mechanism may be configured to switch between the one or more narrow-passband filter elements. Alternatively, or in addition, a narrow-spectrum light source may include a color source and one or more narrow-passband filter elements.

The system may include a color source. The color source may emit light of a first color from which multiple narrow-bandwidth colors can be produced by filtering the light of the first color (e.g., the first color may include a first narrow bandwidth color and a second narrow bandwidth color). In an embodiment, the emission spectrum of the first narrow-bandwidth color may comprise approximately a first half of the emission spectrum of the first color, and the emission spectrum of the first narrow-bandwidth color may comprise approximately a second half of the emission spectrum of the first color. The center frequency of the color source may be adjusted from being within the emission spectrum of the first narrow-bandwidth color to being in the emission spectrum of the second narrow-bandwidth color, for example, when the narrow-bandwidth colors are time multiplexed. Similarly, the emission spectrum of the color source may be adjusted from encompassing the emission spectrum of the first narrow-bandwidth color to encompassing the emission spectrum of the second narrow-bandwidth color. The control mechanism may adjust the center frequency and/or emission spectrum of a light source by adjusting a control voltage to the light source, a modulation frequency to the light source, a drive current to the light source, a temperature of the light source, and/or the like.

The control mechanism may adjust one or more properties of the light source and/or filter elements via a feedback loop. The control mechanism may sense a property of the light source, and adjust the light source, filter elements, and/or intensity control elements based on the sensed property. For embodiments where each pixel contains a light emitter, the control mechanism may sense the property of a light emitter in a sample pixel out of the pixels used to produce images, the property of a light emitter in a reference pixel not used to produce images, and/or the like. The property of the light source may include a temperature, an emission intensity, an emission spectrum, and/or the like. The control mechanism may receive a spectral measurement of an emission spectrum of the light source and may adjust an emission intensity of the light source based on the spectral measurement (e.g., to create a desired color despite a changing emission spectrum). The spectral measurement may be a measurement of a center frequency, an emission width, an average wavelength, a peak wavelength, a statistical moment of the emission spectrum, an otherwise weighted wavelength, and/or the like. Alternatively, or in addition, the emission intensity may be adjusted based on measurements of the temperature of the light source, the emission intensity of the light source, and/or the like. Similarly, the emission spectrum of the light source may be adjusted based on temperature measurements of the light source, emission frequency measurements, and/or the like. In an embodiment, the control mechanism may adjust a drive current based on measurements of emission intensity for the light source and may compensate for anticipated changes in the emission spectrum of the light source when computing how much to adjust the drive current.

Because the first and second sets of narrow-bandwidth colors are offset from one another, the colors produced by the first and second sets of narrow-bandwidth colors may be perceived to be different by a user despite the first and second sets of narrow-bandwidth colors being emitted at identical intensities. The intensities of the first and/or second sets of narrow-bandwidth colors may be adjusted so a first color produced by the first set of narrow-bandwidth colors is perceived by the user to match a second color produced using the second set of narrow-bandwidth colors. In an embodiment, a gamma correction may be computed when determining the adjustments for the intensities of the first and/or second sets of narrow-bandwidth colors.

The narrow-passband filter elements may be selected so a first filter passes the first narrow-bandwidth color and blocks the second narrow-bandwidth color and a second filter passes the second narrow-bandwidth color and blocks the first narrow-bandwidth color. The bandwidth of the first and/or second filters may be between approximately one and 50 nanometers, such as one nanometer, three nanometers, 10 nanometers, 20 nanometers, and/or the like. The bandwidth may be wide enough to avoid speckle but narrow enough for the narrow-bandwidth colors to be perceived as a same color. The locations of the transmission spectrums may be selected based on anticipated properties of a human eye of a viewer. For example, the first and second narrow-bandwidth colors may be selected to be near an anticipated peak sensitivity of photoreceptor cones of a human eye, to avoid a steep slope section of an anticipated photoreceptor cone sensitivity curve for a human eye, to produce a desired color gamut for a human eye, to minimize detectability of color differences between the first and second narrow-bandwidth colors by a human eye, and/or the like.

The transmission spectrums of the narrow-passband filter elements may be selected to limit crosstalk. Crosstalk may occur when a user is able to view narrow-bandwidth colors that the user is attempting to block. Crosstalk may decrease spectroscopic separation, decrease clarity of images specific to users and/or desired images, and/or the like. An intersection point of the transmission spectrums of narrow-passband filter elements may be selected to reduce crosstalk below a predetermined threshold. For example, the transmission spectrum of the first filter (e.g., transmission as a function of wavelength) may include an upper three, six, 10, and/or 100 decibel ("db") point less than a lower three, six, 10, and/or 20 db point of the transmission spectrum of the second filter. Alternative metrics may be used to determine the locations of the transmission spectrums, such as selecting an area of intersection of the transmission spectrums to be less than a predetermined threshold.

In some embodiments, a narrow-passband filter element may be tunable. The temperature, applied voltage, angle of incident light, and/or the like may be adjusted to change the transmission spectrum of the tunable, narrow-passband filter element. The tunable, narrow-passband filter element may include an electroactive material, and the control mechanism may adjust the voltage to the electroactive material to adjust the transmission spectrum of the tunable, narrow-passband filter element. The control mechanism may alternate between applying a first voltage and applying a second voltage to cause the filter to change between passing the first narrow-bandwidth color and passing the second narrow-bandwidth color. Alternatively, or in addition, the filter may be spatially multiplexed by applying different voltages to different portions of the filter. The tunable, narrow-passband filter element may be tuned during manufacture, may be tuned by a user, may be configured to alternate between passing predetermined transmission spectrums (e.g., passing a first narrow-bandwidth color during a first image frame and passing a second narrow-bandwidth color during a second image frame), and/or the like.

The narrow-passband filter elements and/or color filter elements may be arranged in each pixel as a predetermined mosaic. The narrow-passband filter elements may be multilayer filters in some embodiments. The multilayer filters may include an interference filter with layers that constructively and/or destructively interfere light to pass and/or block particular narrow-bandwidth colors. The thickness of the layers may determine which wavelengths of light are passed and/or blocked, so the thickness of the layers may be adjusted to change the transmission spectrum of the interference filter.

The viewing device may include filters with one or more passbands, stopbands, and/or partial-attenuation bands. The filters may be selected to provide optimal stereoscopic image pair separation, to display an obfuscated image and/or block obfuscatory image content, to display an image specific to a user and/or block image content for another user, and/or the like. For example, the viewing device may include a first lens and/or a second lens. The first lens may include a first transmission spectrum with a first set of one or more narrow passbands, a first set of one or more narrow stopbands, and/or a wide, partial-attenuation band. The narrow passbands and narrow stopbands may be selected to correspond to light emissions interpretable as substantially a same color by users. The second lens may include a second transmission spectrum complementary to the first transmission spectrum. The second transmission spectrum may include a second set of one or more narrow passbands overlapping the first set of narrow stopbands, a second set of one or more narrow stopbands overlapping the first set of narrow passbands, and/or a wide, partial-attenuation band. The first and second sets of narrow stopbands may encompass the second and first sets of narrow passbands respectively to minimize crosstalk. Alternatively, the second lens may include a second transmission spectrum that matches the first transmission spectrum.

The viewing device may include one or more filter assemblies. The filter assemblies may include interchangeable filter elements. A complementary filter may be used for viewing stereoscopic images, and the complementary filter may be exchanged for a matching filter for viewing images specific to users, obfuscated images, and/or the like or vice versa. Alternatively, or in addition, the filters of the viewing device may be tunable, and a user may change a transmission spectrum of a filter from matching to complementary or vice versa. For example, the filters may be made of an electroactive material that changes the passbands and/or stopbands based on changes in a control voltage. The user may also, or instead, tune the filter to match a display device configured to produce images comprising narrow-bandwidth colors. In some embodiments, the emission frequency of the display device also may be tunable as previously discussed. The viewing device and/or the display device may indicate to the user which frequencies the filter has been tuned to pass and/or block (e.g., by indicating the center frequency of one or more narrow passbands and/or narrow stopbands).

Various other filters may be used in the viewing device. For example, filters may block images specific to other users and provide separation of spectroscopic pairs. Multiple narrow-bandwidth colors of a same color may be used when displaying an image to improve color quality. Accordingly, the filters may include a transmission spectrum with multiple narrow passbands selected to be interpreted as a same color by the user, and/or the first and/or second transmission spectrums may each comprise only one narrow passband per color. A user may be viewing an image including narrow-bandwidth colors that does not require stereoscopic separation, blocking of images specific to other users, blocking of obfuscatory content, and/or the like. In such a case, the filter may only include narrow passbands and a wide, partial-attenuation band; the filter may not need to include narrow stopbands. Alternatively, or in addition, the filter may include a plurality of narrow passbands for each of a plurality of colors and a wide stopband configured to substantially attenuate other frequencies. The filter may be configured to enhance contrast by attenuating background light. Accordingly, the wide stopband may occupy a larger portion of a transmission spectrum corresponding to each color than the plurality of passbands to minimize background light at each color.

The narrow stopbands may be configured to have a predetermined optical density. For example, the optical density may be approximately 2-3, approximately 3-4, greater than approximately 4, and/or the like. Similarly, the wide, partial-attenuation band may be configured to attenuate light (e.g., from a background light source) by a predetermined amount. For example, the wide, partial-attenuation band may attenuate light by approximately two, three, four, five, 10, 20, 50, 100, and/or the like. The transmission spectrum of the wide, partial-attenuation band may be essentially spectrally flat and/or may vary based on wavelength. The transmission spectrum of the wide, partial-attenuation band may be inversely related to an expected emission spectrum of a background light source. The wide, partial-attenuation band may attenuate the background light source without changing color renderings and/or may pass a background light of interest. Alternatively, or in addition, an additional narrow stopband may block a high-intensity band of an expected emission spectrum of the background light source. The background light source may be an incandescent light, a fluorescent light, an LED, a halogen light, the sun, and/or the like. Alternatively, or in addition, the background light source may produce white light using narrow bandwidth colors that can be filtered by the viewing device.

The background light source may be selected to not emit light in the narrow passbands of the viewing device. For example, a lens may include a coupling mechanism to couple to the background light source. The lens may include one or more narrow stopbands corresponding to and/or encompassing the narrow passbands of the viewing device and may be configured to filter light from the background light source to block light in the narrow stopbands. In contrast, it may be desirable for a remote control device configured to transmit commands to the display device to emit light in the narrow passbands of the viewing device so the remote control device is visible to a user. In an embodiment, an input button on the remote control device may emit light in the narrow passbands, and the light emitted by the input button may identify a function performed by the input button.

The background light source may produce glare that reduces clarity of image content from a display device. The glare may be polarized, so the viewing device may include a polarizer configured to reject (e.g., attenuate) an expected polarization of glare. The image content produced by the display device may be polarized orthogonally to the expected polarization of glare. The polarizer of the viewing device may be configured to pass an expected polarization of the image content. Thus, the polarizer may not attenuate the image content while attenuating glare.

Figure 1B:
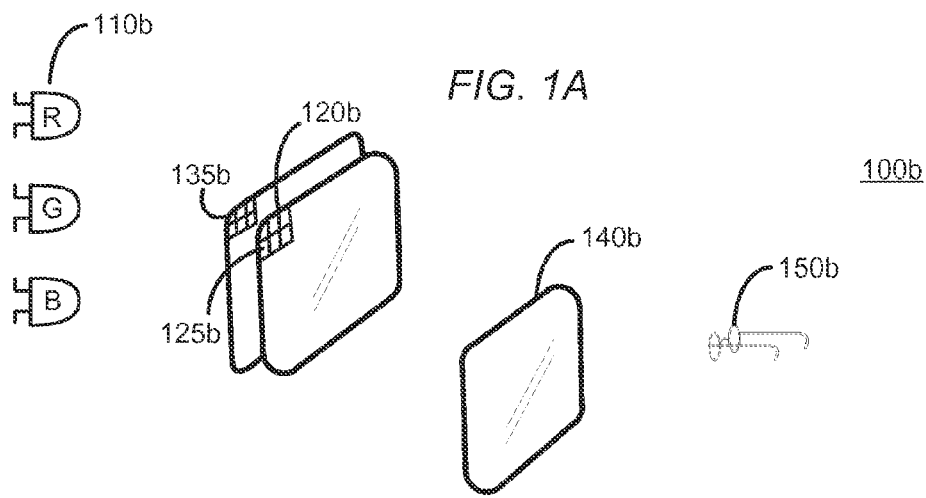
Figure 1C:
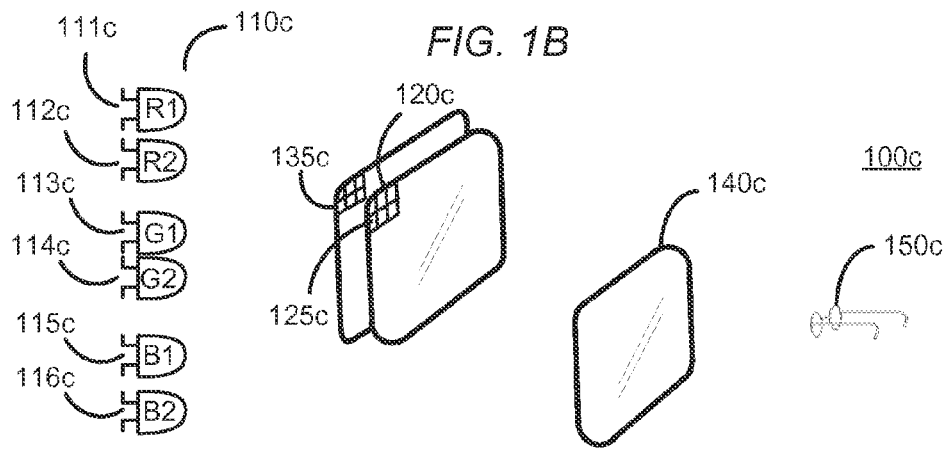

FIGS. 1A-1C are expanded views of systems 100a-c for producing images including narrow-bandwidth colors using a plurality of narrow-passband filter elements 125a-c. Each system 100a-c may include a light source 110a-c, such as a broad-spectrum light source 110a, a plurality of color sources 110b, a plurality of narrow-spectrum light sources 110c, and/or the like. The light source 110a-c may emit light at a plurality of pixels (e.g., a pixel 120a-c). Each system 100a-c may include a light source 110a-c configured to emit light at every pixel 120a-c, multiple light source 110a-c configured to emit light at corresponding sets of pixels 120a-c and/or the like. In some embodiments, the intensity of light emitted by the light source 110a-c is based on the lightness of an image to be produced and/or the lightness of a region of the image.

For the system 100c with a plurality of narrow-spectrum light sources 110c, two or more of the narrow-spectrum light sources 110c may be selected to be interpreted as substantially a same color by a user. For example, the narrow-spectrum light sources 110c may include a first pair of light emitters 111c, 112c selected to be interpreted as emitting red light, a second pair of light emitters 113c, 114c selected to be interpreted as emitting green light, and a third pair of light emitters 115c, 116c selected to be interpreted as emitting blue light. Each pair of the light emitters 111-116c may emit light simultaneously, such as by emitting light continuously, and/or the light emitters 111-116c in each pair may produce light at different times (e.g., each light emitter 111-116c in each pair may emit light during a corresponding set of image frames). In an embodiment with light emitters 111-116c that do not produce light simultaneously, a plurality of color filter elements may be used instead of the plurality of narrow-passband filter elements 125a-c.

Each system 100a-c may include one or more intensity control elements 135a-c. The intensity control elements 135a-c may adjust the amount of light passed through the pixel 120a-c for each narrow-bandwidth color. In an embodiment, there may be one intensity control element 135a-c for each narrow-passband filter element 125a-c or color filter element. The relative intensity for each narrow-bandwidth color may be adjusted to cause the user to perceive the pixel 120a-c as a color of interest. In the illustrated embodiment, the intensity control elements 135a-c are located between the light source 110a-c and the plurality of narrow-passband filter elements 125a-c. In alternate embodiments, the intensity control elements 135a-c may receive light from the light source 110a-c after it has passed through the plurality of narrow-passband filter elements 125a-c, and/or the narrow-passband filter elements 125a-c may include the intensity control elements 135a-c. A front panel 140a-c may receive the filtered, intensity-adjusted light from the pixels 120a-c and display an image to a user 150a-c. The front panel 140a-c may include a polarizer in some embodiments, such as when the intensity control elements 135a-c include a liquid crystal.

Figure 2A:
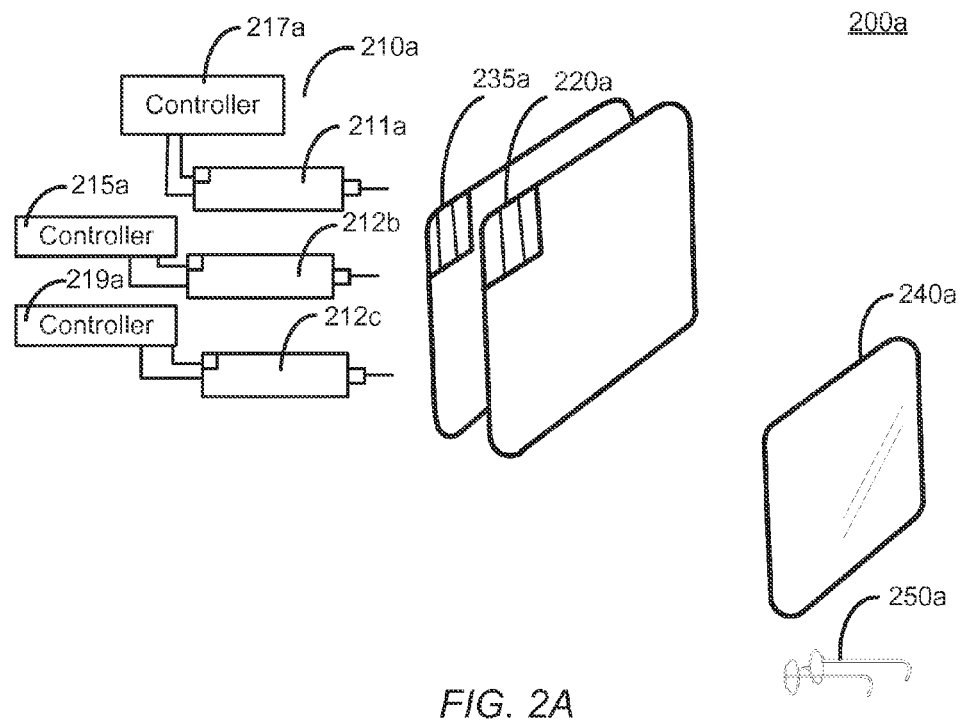
FIGS. 2A-2B are expanded views of systems for producing images including narrow-bandwidth colors using a plurality of narrow-spectrum light sources.
Figure 2B:
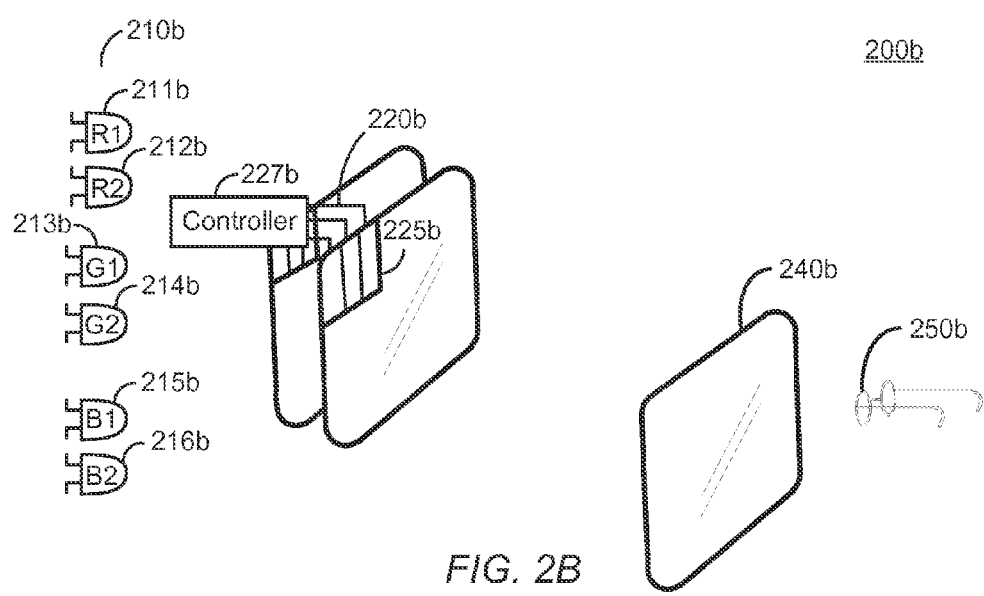

FIGS. 2A-2B are expanded views of systems 200a-b for producing images including narrow-bandwidth colors using narrow-spectrum light sources 210a-b. The narrow-spectrum light sources 210a-b may include a plurality of narrow-spectrum light emitters 211-213a with adjustable emission spectrums and/or a plurality of narrow-spectrum light emitters 211-216b with fixed emission spectrums. One or more controllers 217-219a may be communicatively coupled to the narrow-spectrum light emitters 211-213a. The controllers 217-219a may be configured to indicate desired emission spectrums to the narrow-spectrum light emitters 211-213a. For example, the controllers 217-219a may be configured to cause the narrow-spectrum light emitters 211-213a to alternate between each emitting light in a respective first narrow band and each emitting light in a respective second narrow band. In some embodiments, the controllers 217-219a and the narrow-spectrum light emitters 211-213a may be configured to alternate between more than two narrow bands.

The narrow-spectrum light sources 210a-b may emit light at a plurality of pixels (e.g., a pixel 220a-b). The systems 200a-b may include multiple sets of narrow-spectrum light sources 210a-b in some embodiments. The pixels 220a-b may include a plurality of color filter elements 225a and/or a plurality of narrow-passband filter elements 225b. In an embodiment, the plurality of color filter elements 225a may each be configured to pass a corresponding set of narrow-bandwidth colors. The emissions of the narrow band colors may be time multiplexed so only one narrow-bandwidth color passes through a color filter element 225a at a time. Alternatively, one or more controllers 227b may alter a transmission frequency of a plurality of narrow-passband filter elements 225b between one or more narrow passbands. For example, the one or more controllers 227b may cause the narrow-passband filter elements to alternate between passing a plurality of narrow-bandwidth colors in a predetermined sequence. The narrow-passband filter elements 225b in different pixels 220b may simultaneously pass the same narrow-bandwidth colors or simultaneously pass different narrow-bandwidth colors, such as if the system simultaneously displays two fields from two distinct frames of interlaced videos. In an alternate embodiment, the plurality of narrow-spectrum light emitters 211-216b may be time multiplexed and the second system may include color filters rather than the narrow-passband filter elements 225b and the controller 227b.

The systems 200a-b may include one or more intensity control elements 235a-b. The one or more intensity control elements 235a-b may synchronized with the one or more controllers 217-219a, 227b. When a first image frame including a first plurality of narrow-bandwidth colors is displayed, the one or more intensity control elements 235a-b may pass light at a first set of intensities, and when a second image frame including a second plurality of narrow-bandwidth colors is displayed, the one or more intensity control elements 235a-b may pass light at a second set of intensities. A front panel 240a-b may receive light from the pixels 220a-b and display an image to a user 250a-b. When the intensity control elements 235a-c include a liquid crystal, the front panel 240a-b may include a polarizer.

Figure 3:
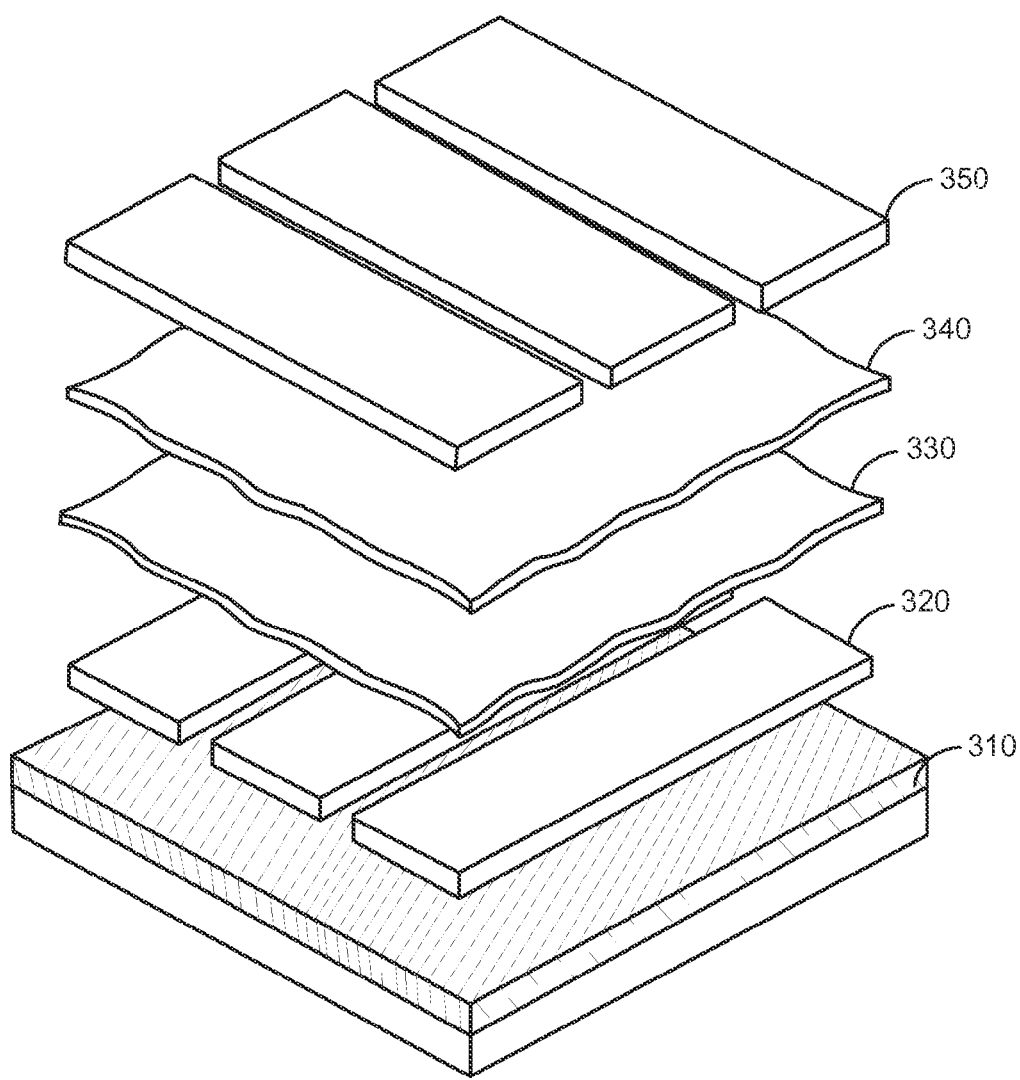
FIG. 3 is an exploded view of an organic light emitting diode ("OLED") that may be included in a pixel and/or subpixel.

In various embodiments, light sources may be included in the pixels and/or subpixels. For example, FIG. 3 is an exploded view of an OLED 300 that may be included in a pixel and/or subpixel. The OLED 300 may include a substrate 310 to provide structural stability to the OLED 300. The substrate 310 may support an anode 320. The anode 320 may be electrically coupled to a conductive layer 330 and configured to remove electrons from the conductive layer 330 (e.g., deliver holes to the conductive layer 330). The OLED 300 may also include a cathode 350 configured to deliver electrons to an emissive layer 340. When holes in the conductive layer 330 combine with electrons in the emissive layer 340, light may be emitted by the OLED 300.

The conductive and emissive layers 330, 340 may be made from organic materials. The particular materials selected may determine the wavelength of the light emitted by the OLED 300. The materials may be selected to cause the OLED 300 to emit a narrow-bandwidth color. Alternatively, the conductive and emissive layers 330, 340 may emit light with a broader spectrum, and the substrate 310, the cathode 350, and/or one or more additional layers (not shown) may include narrow-passband filter elements. The narrow-passband filter elements may be configured to switch between passing one or more narrow-bandwidth colors and/or configured to pass a single narrow-bandwidth color.

Figure 4:
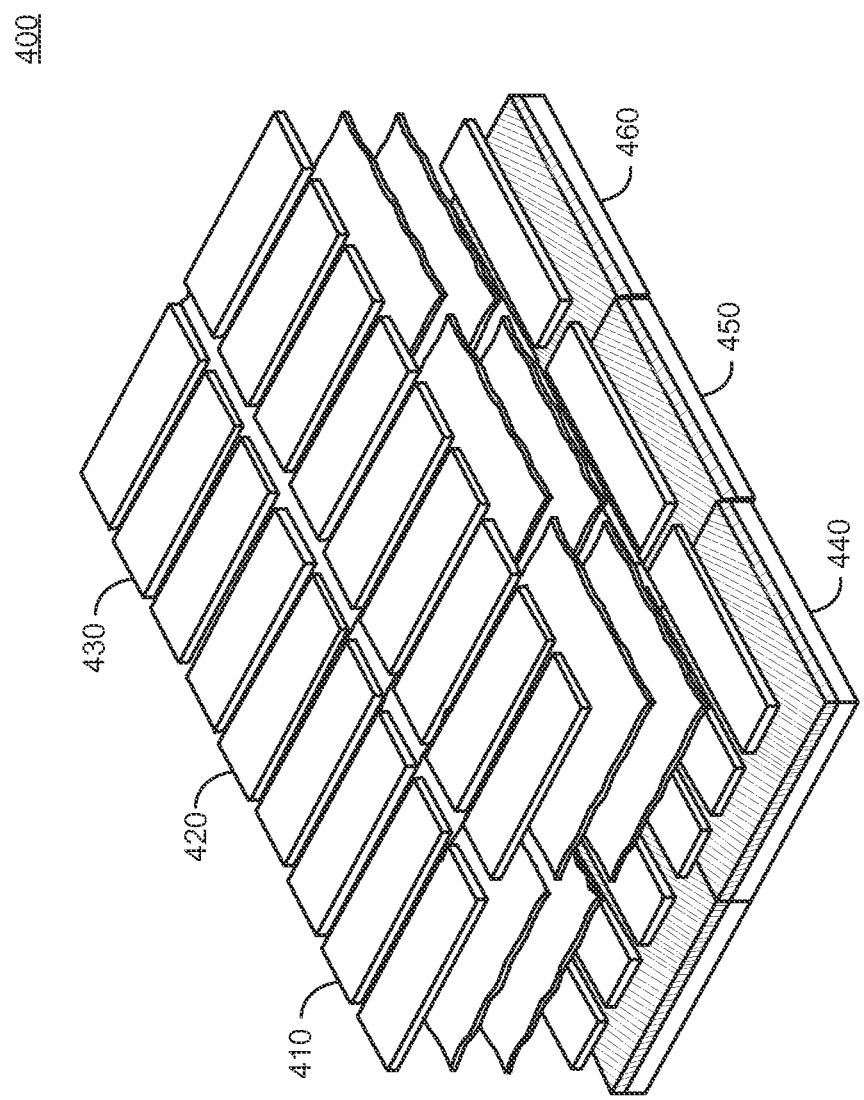
FIG. 4 is an exploded view of a pixel for producing narrow-bandwidth colors.

FIG. 4 is an exploded view of a pixel 400 for producing narrow-bandwidth colors. The pixel 400 may comprise a plurality of OLEDs 410-460. Each OLED 410-460 may be configured to emit a single narrow-bandwidth color. The pixel 400 may combine a plurality of narrow-bandwidth colors to create the appearance of different pixel colors a human eye. The pixel 400 may include a plurality of sets of narrow-bandwidth colors so a user can filter one or more of the sets. For example, the pixel 400 may include two red OLEDs 410, 440, two green OLEDs 420, 450, and two blue OLEDs 430, 460, and the user may selectively filter the narrow-bandwidth colors produced by the first set of OLEDs 410-430 and/or the second set of OLEDs 440-460.

Figure 5A:
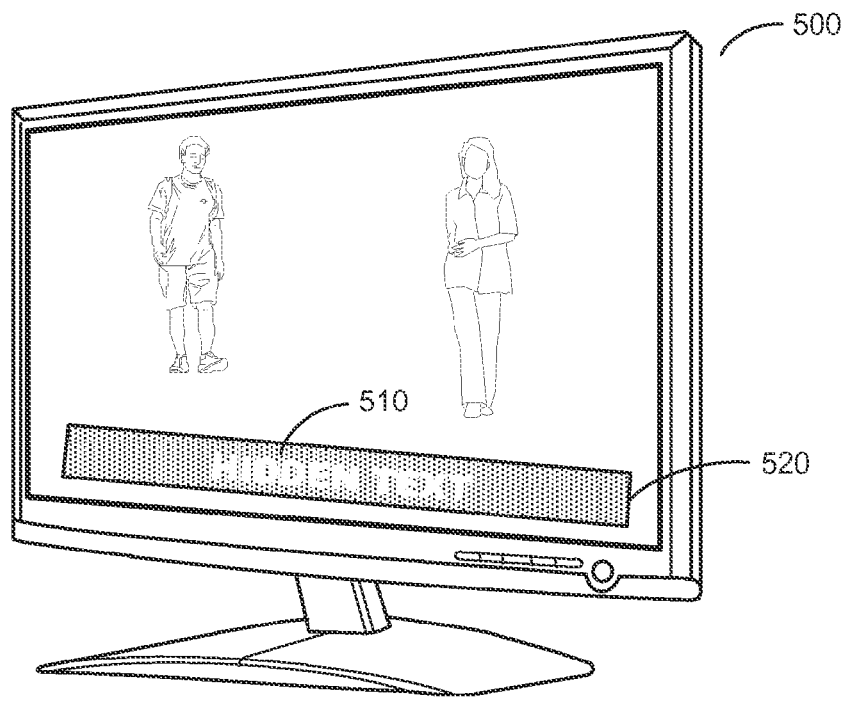
FIGS. 5A-5B are perspective views of a displayed image when viewed with and without narrow-passband filter elements.
Figure 5B:
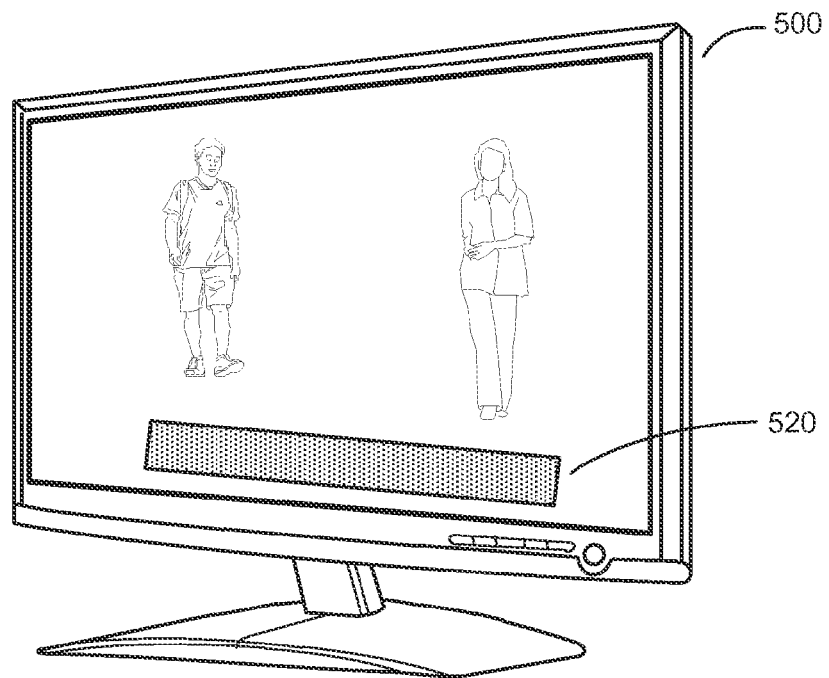

FIGS. 5A-5B are perspective views of a displayed image 500 when viewed with and without narrow-passband filter elements. The displayed image 500 may include secret content 510 that is only visible when some narrow-bandwidth colors have been filtered. When no filtering has occurred, the displayed image 500 may appear to have an obfuscation 520. The secret content 510 may be displayed via omission of one or more colors in a first image and addition of the one or more colors in a second image to obfuscate the omission. For example, the secret content 510 may be black text on a lighter background with the first image displaying the black text and lighter background and the second image displaying the lighter background at the same location as the text. Alternatively, the secret content 510 may be displayed by addition of colors in the first image and addition of colors in the second image that obfuscate the location and/or understandability of the secret content 510 in the first image. Obfuscation may be used to protect personal information, for example, with computers in public locations, when a user is entering a password into a device, with automatic teller machines, and/or the like.

Figure 6A:
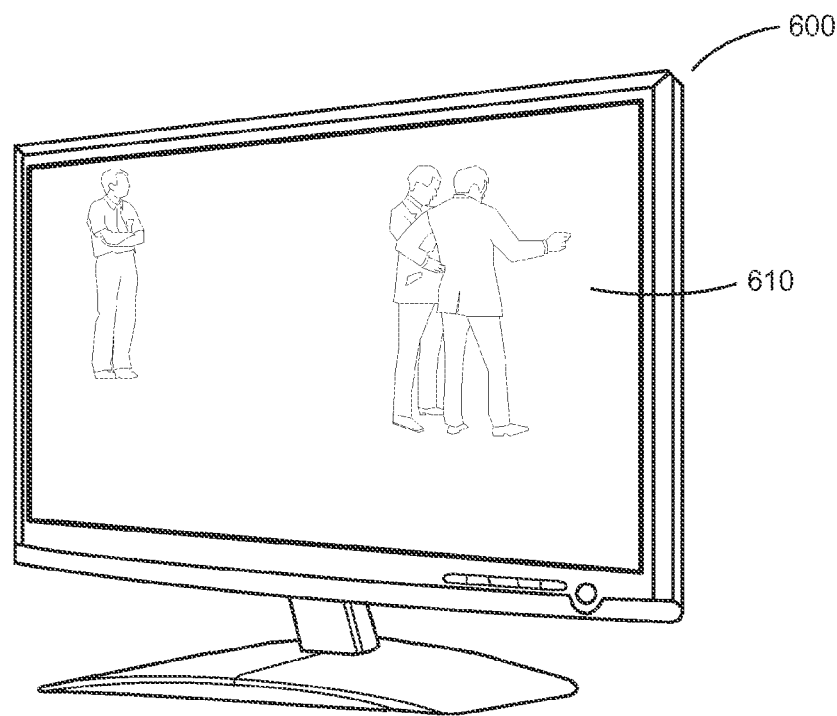
FIGS. 6A-6B are perspective views of a displayed image when viewed with two different narrow-passband filter elements.
Figure 6B:
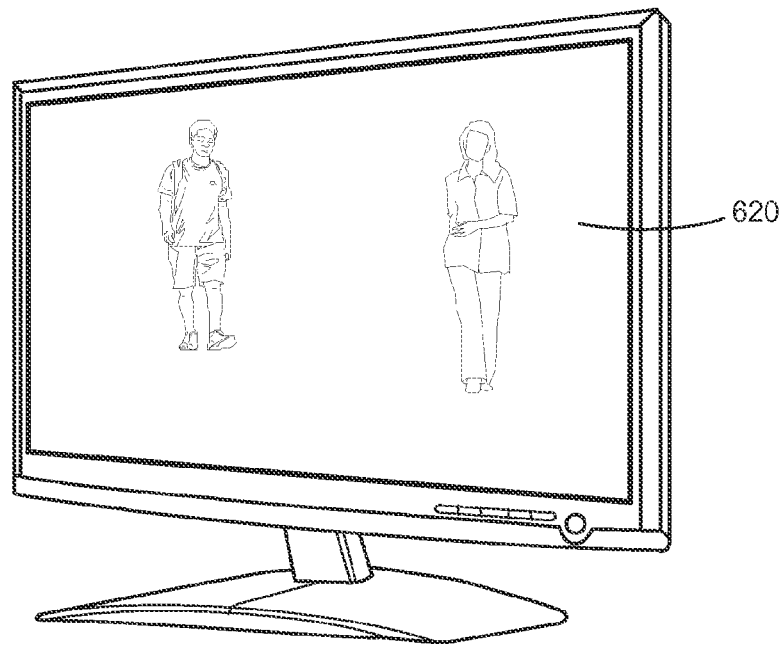

FIGS. 6A-6B are perspective views of a displayed image 600 when viewed with two different narrow-passband filter elements. The displayed image 600 may include two images 610, 620 specific to first and second users. Each image 610, 620 may be displayed with a different set of narrow-bandwidth colors. Each user may be able to view an image 610, 620 of interest by using narrow-passband filter elements to view only the narrow-bandwidth colors used to create the image 610, 620 of interest. Each user may also have a personal audio source configured to deliver audio corresponding to the image 610, 620 of interest without disturbing any other users (e.g., by using headphones). In some embodiments, there may be more than two images specific to users, and each user may filter out the images from all other users. Alternatively, or in addition, each user may wish to view a stereoscopic pair and may block all images other than the stereoscopic pair of interest.

Figure 7A:
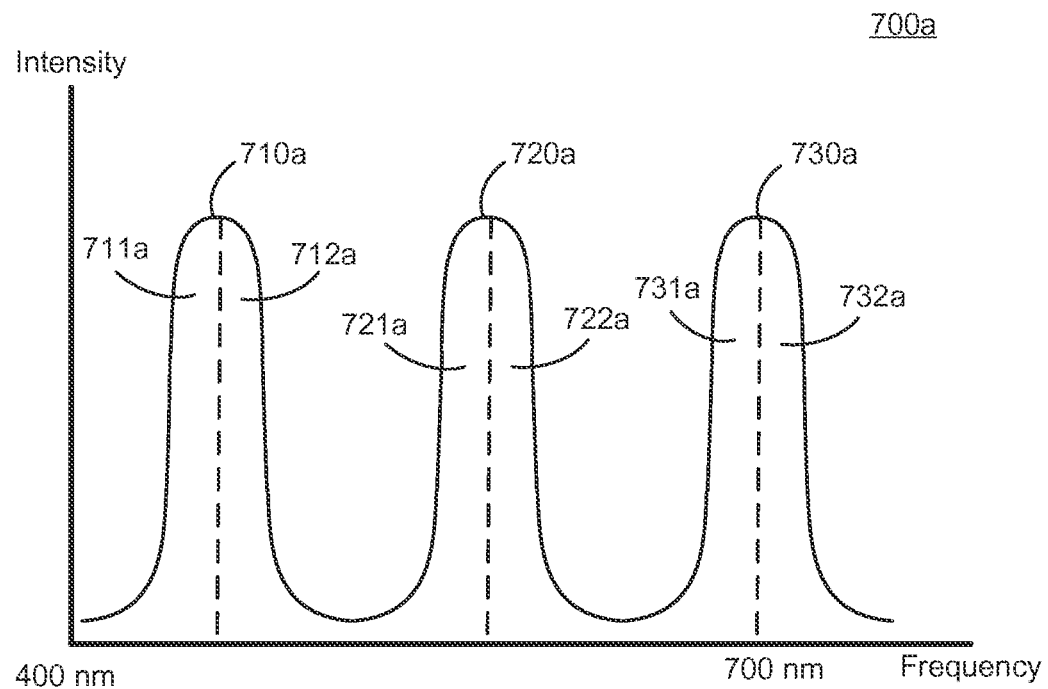
FIG. 7A is a graph of an emission spectrum for a plurality of color sources.

FIG. 7A is a graph 700a of an emission spectrum for a plurality of color sources (e.g., the plurality of color sources 110b). The plurality of color sources 110b may emit a plurality of colors 710-730a. Narrow-passband filters (e.g., the narrow-passband filters 125b) may split the plurality of colors 710-730a into narrow-bandwidth colors. For example, the narrow-passband filters 125b may be configured to pass approximately a first half 711-731a and approximately a second half 712-732a of each color 710-730a.

Figure 7B:
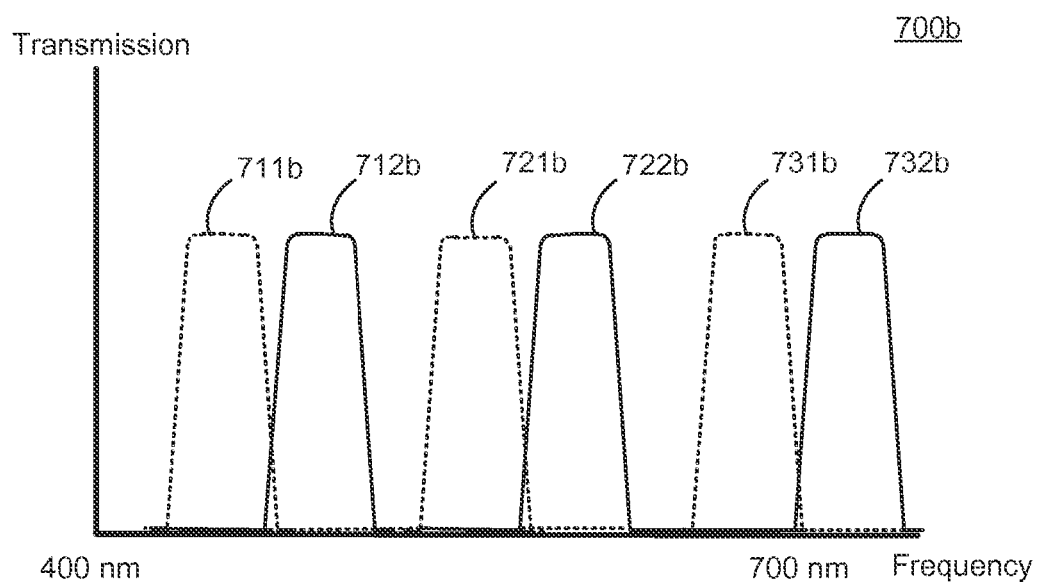
FIG. 7B is a graph of a transmission spectrum for a plurality of filters corresponding to the emission spectrum for the plurality of color sources.

FIG. 7B is a graph 700b of a transmission spectrum for one or more filters corresponding to the emission spectrum for the plurality of color sources 110b. The one or more filters may be part of a system for producing images with narrow-bandwidth colors and/or part of a viewing device for viewing images including narrow-bandwidth colors. A first set of bandwidths 711-731b may be passed or blocked by the one or more filters, and a second set of bandwidths 712-732b may be passed or blocked by the one or more filters. The one or more filters may allow users to view a spectroscopic pair, images specific to the users, a desired image, and/or the like.

FIGS. 8A-8B are graphs 800a-b of transmission spectrums for a plurality of filters corresponding to the emission spectrum for the plurality of color sources 110b. The first and second sets of bandwidths 811-831a, 811-831b, 812-832a, 812-832b may intersect at one or more intersection points 815-835a, 815-835b. The intersection points 815-835a, 815-835b may be selected to prevent crosstalk from exceeding a usability threshold. For example, the intersection points 815-835a may be at or below a 3 db point for each set of bandwidths 811-831a, 812-832a. In another embodiment, the intersection points 815-835b may be at or below a 10 db point for each set of bandwidths 811-831b, 812-832b. Other intersection points 815-835a, 815-835b may be used depending on the desired level of crosstalk, the proximity of the narrow-bandwidth colors, and/or the like.

Figure 9A:
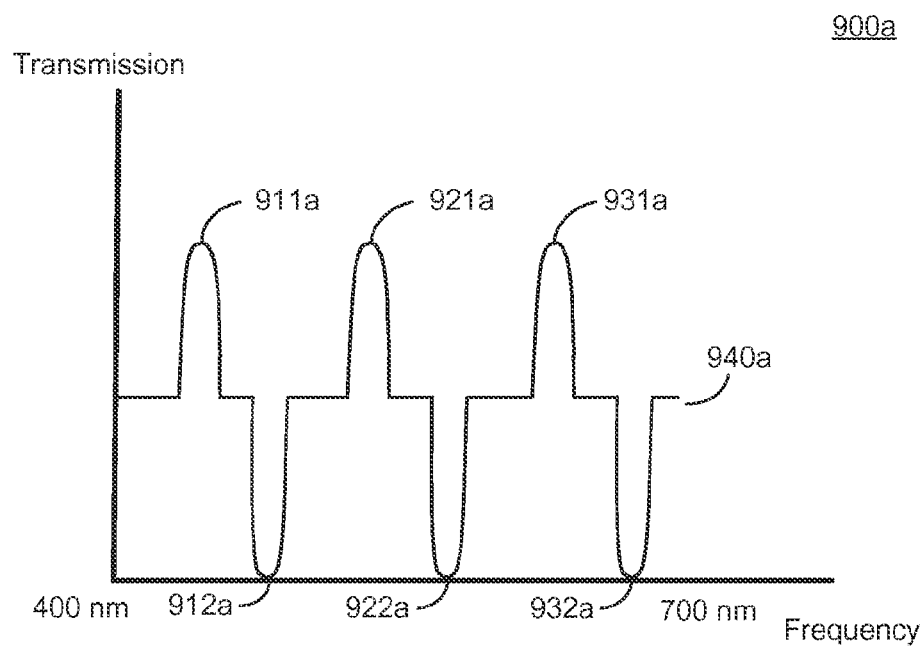
FIGS. 9A-9B are graphs of transmission spectrums for complementary filters in one or more viewing devices.
Figure 9B:
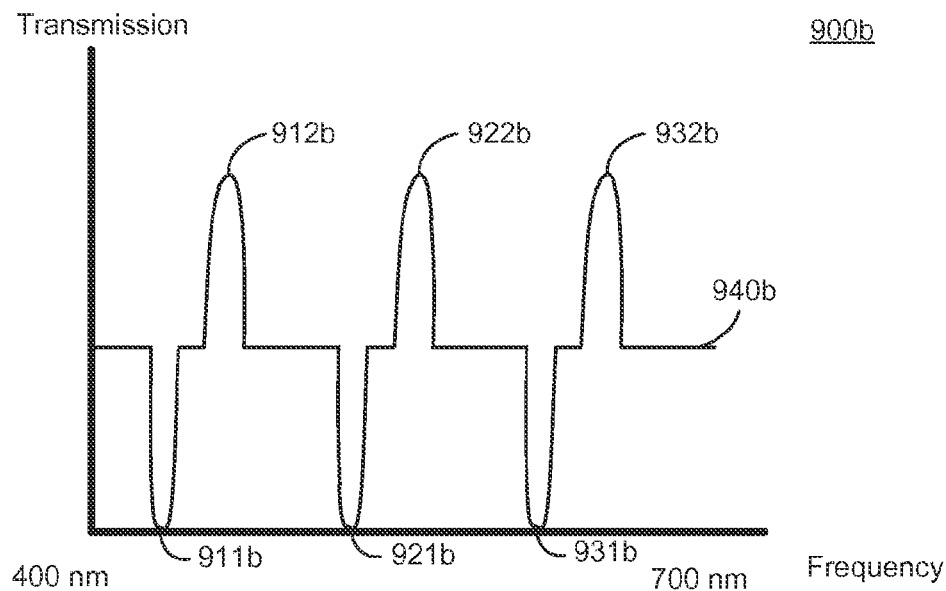

FIGS. 9A-9B are graphs 900a-b of transmission spectrums for complementary filters in one or more viewing devices. The complementary filters may separate images specific to users for the users, separate a stereoscopic pair for one or more users, and/or the like. The complementary filters may each include a wide, partial-attenuation band 940a-b configured to attenuate background light. A first filter may be configured with one or more narrow passbands 911-931a corresponding to a first set of narrow-bandwidth colors and one or more narrow stopbands 912-932a corresponding to a second set of narrow-bandwidth colors. The one or more narrow stopbands 912-932a may be configured to attenuate light significantly more than the wide, partial-attenuation band 940a to eliminate crosstalk while still allowing the user to see some background light.

A second filter may be configured with one or more narrow stopbands 911-931b corresponding to the first set of narrow-bandwidth colors and one or more narrow passbands 912-932b corresponding to the second set of narrow-bandwidth colors. Accordingly, the first filter may be used by a first user to view an image specific to the first user while blocking narrow-bandwidth colors associated with an image specific to a second user, and the second filter may be used by a second user to view the image specific to the second user while blocking the image specific to the first user. Alternatively, the user may view a stereoscopic pair and the first and second filters may filter light received by each eye of the user. In some embodiments, the first and/or second filter may include more than one set of narrow stopbands, such as if there are more than two users, if there are two or more users and at least one is viewing a stereoscopic pair, and/or the like.

FIGS. 10A-10B are a graph 1000a of an emission spectrum of a background light source and a graph 1000b of a corresponding transmission spectrum of one or more filters in a viewing device. A user may desire to view an image without seeing glare and/or background light from the background light source, but the user may need to leave the background light source on for the convenience of other people and/or other reasons. Energy emitted by the background light source may be concentrated at a few bandwidths 1051-1053a, so the viewing device may be configured to block light at those bandwidths.

For example, the one or more filters in the viewing device may include a wide, partial-attenuation band 1040b. In addition, the one or more filters may include a plurality of narrow passbands 1011-1031b and a plurality of narrow stopbands 1012-1032b configured to pass or block narrow-bandwidth colors used by a display device to create one or more images. The one or more filters may also include one or more narrow stopbands 1051-1053b selected to block the bandwidths 1051-1053a at which the background light source emits light. The plurality of narrow passbands 1011-1031b and narrow stopbands 1012-1032b at which the display device emits light may be selected to not overlap with the bandwidths 1051-1053a at which the background light source emits light. The particular bandwidths used by the display device may depend on the background light source and/or desired properties of the colors and/or color space. In some embodiments, the background light source may include a filter to block light at bandwidths used by the display device and/or that is complementary with the one or more filters in the viewing device to prevent the user from viewing the background light source.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An enhanced contrast viewing device for viewing images comprising narrow bandwidth colors, the device comprising:
    a plurality of filters including:
        a first lens with a first transmission spectrum comprising:
            a first narrow passband selected to pass a desired image,
            a first narrow stopband, wherein the first narrow stopband and the first narrow passband are selected to correspond to light emissions interpretable as substantially a same color by a user, and
            a first wide, partial-attenuation band selected to pass a first portion of background light and to block a second portion of the background light, wherein the first wide, partial-attenuation band is essentially spectrally flat and occupies a larger portion of spectrum than the first narrowband passband.

2. The device of claim 1, wherein the plurality of filters further includes:
    a second lens with a second transmission spectrum comprising:
    a second narrow passband overlapping the first narrow stopband, and
    a second narrow stopband overlapping the first narrow passband.

3. The device of claim 2, wherein the first narrow stopband encompasses the second narrow passband, and wherein the second narrow stopband encompasses the first narrow passband.

4. The device of claim 1, wherein the plurality of filters further includes a second lens with a second transmission spectrum matching the first transmission spectrum.

5. The device of claim 1, wherein the first narrow stopband comprises an optical density selected from the group consisting of 2-3, 3-4, and greater than 4.

6. The device of claim 1, wherein the first lens comprises a polarizer configured to pass light with a polarization corresponding to an expected polarization of image content from a display device.

7. The device of claim 1, wherein the first lens comprises a polarizer configured to reject light with a polarization corresponding to an expected polarization of glare.

8. The device of claim 1, wherein the first transmission spectrum further comprises a second narrow stopband selected to correspond to a high-intensity band of an expected emission spectrum of a background light source.

9. The device of claim 1, wherein the first transmission spectrum comprises a second narrow passband selected to be interpreted as a same color as the first narrow passband by a user.

10. The device of claim 1, wherein attenuation of the first wide, partial-attenuation band is substantially constant across the first wide, partial-attenuation band.

11. The device of claim 10, wherein the first wide, partial-attenuation band attenuates the background light without changing color renderings.

12. A method for providing enhanced contrast viewing of images comprising narrow bandwidth colors, the method comprising:
    providing a first filter lens configured to include a first transmission spectrum comprising:
        a first plurality of narrow passbands selected to pass a desired image, and
        a first wide, partial-attenuation band selected to pass a first portion of background light and to block a second portion of the background light, wherein the first wide, partial-attenuation band is essentially spectrally flat and occupies a larger portion of spectrum than a narrowband passband from the first plurality of narrow passbands.

13. The method of claim 12, wherein the first wide, partial-attenuation band is inversely related to an expected emission spectrum of a background light source.

14. The method of claim 12, wherein the first wide, partial-attenuation band is configured to attenuate an expected emission spectrum of a background light source without changing color renderings.

15. The method of claim 12, wherein the first wide, partial-attenuation band is configured to pass a background light of interest.

16. The method of claim 12, wherein the first wide, partial-attenuation band is configured to attenuate light by approximately a factor selected from the group consisting of two, three, four, five, 10, 20, 50, and 100.

17. The method of claim 12, wherein the first filter lens comprises an eyeglass lens.

18. The method of claim 12, wherein the first filter lens comprises a contact.

19. The method of claim 12, wherein providing the first filter lens comprises providing a window comprising the first filter lens.

20. The method of claim 12, wherein the first filter lens comprises a filter assembly.

21. The method of claim 20, wherein the filter assembly comprises interchangeable filter elements.

22. The method of claim 20, wherein the filter assembly comprises interchangeable filter elements comprising a first interchangeable filter element having a second transmission spectrum substantially identical to the first transmission spectrum and a second interchangeable filter element having a third transmission spectrum complementary to the first transmission spectrum.

23. The method of claim 12, wherein attenuation of the first wide, partial-attenuation band is substantially constant across the first wide, partial-attenuation band.

24. The method of claim 23, wherein the first wide, partial-attenuation band attenuates the background light without changing color renderings.

25. A method for providing enhanced contrast viewing of images comprising narrow bandwidth colors, the method comprising:
    providing a first filter lens configured to include a first transmission spectrum comprising:
        a first plurality of narrow passbands selected to be interpreted by a user as a first color,
        a second plurality of narrow passbands selected to be interpreted by a user as a second color, and
        a first wide stopband configured to pass a first portion of in-band frequencies and to block a second portion of the in-band frequencies,
        wherein the first wide stopband is essentially spectrally flat and occupies a larger portion of a spectrum of the first color than the first plurality of narrow passbands.

26. The method of claim 25, wherein attenuation of the first wide stopband is substantially constant across the first wide stopband.

* * * * *